E. H. WULFF.
METHOD OF MAKING TIRE RIMS.
APPLICATION FILED SEPT. 8, 1921.
1,437,628.
Patented Dec. 5, 1922.
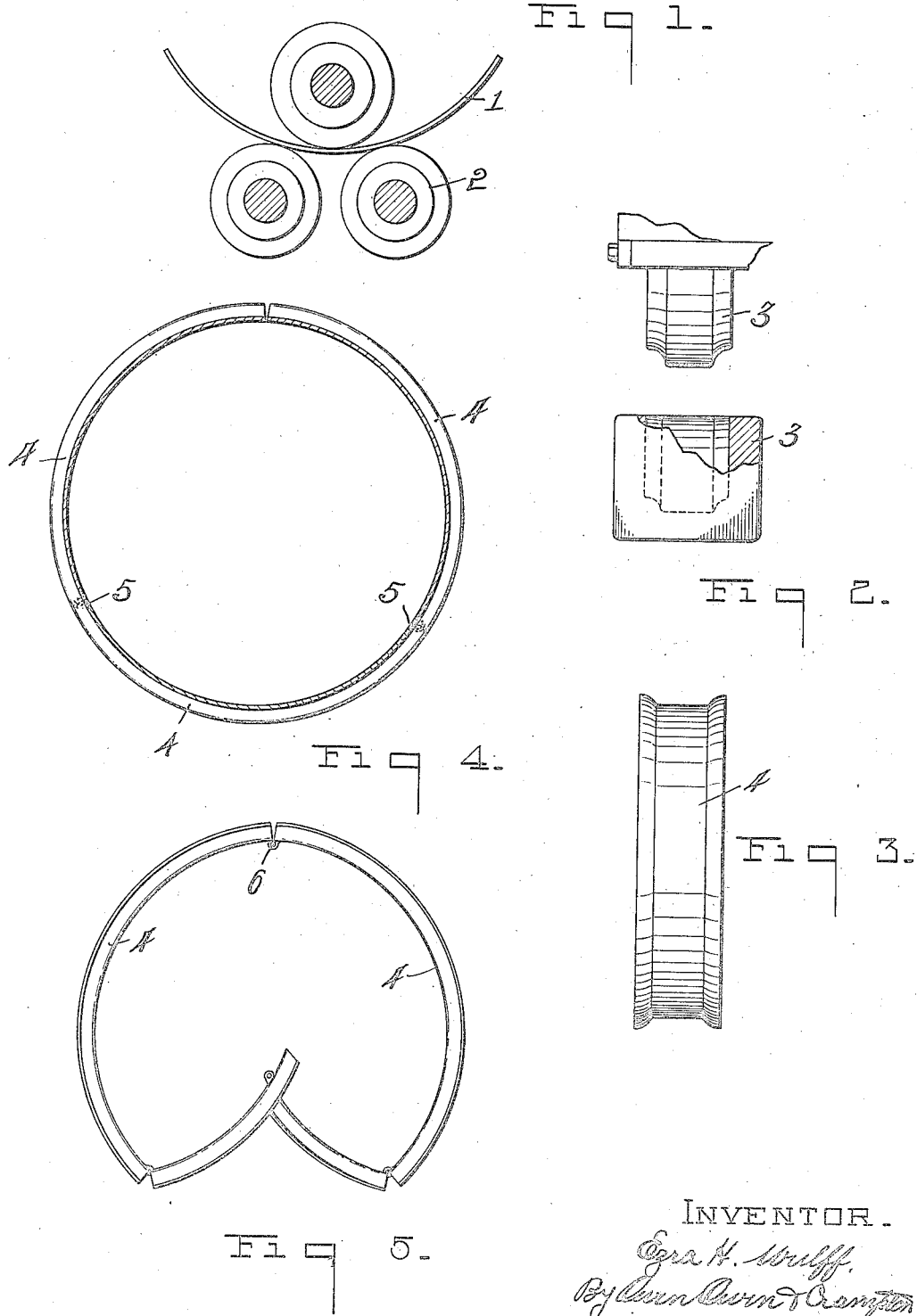

Patented Dec. 5, 1922.

1,437,628

UNITED STATES PATENT OFFICE.

EZRA H. WULFF, OF TOLEDO, OHIO.

METHOD OF MAKING TIRE RIMS.

Application filed September 8, 1921. Serial No. 499,281.

*To all whom it may concern:*

Be it known that I, EZRA H. WULFF, a citizen of the United States, and a resident of Toledo, in the county of Lucas and State of Ohio, have made an Invention Appertaining to Methods of Making Tire Rims; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to the manufacture of steel tire holding rims for use on automobiles, and has for its object to produce a rim in a more accurate, rapid and economical manner than has heretofore been done, and to eliminate the waste incident to the steel rim making methods heretofore employed.

In the manufacture of steel tire holding rims, as heretofore employed so far as I am aware, the manufacturer orders steel having a carbon content which may vary within certain limits, so that one batch of steel may be considerably harder than another. In forming the rims, steel strips of proper size are rolled into a circle and the rim flanges formed thereon by the rolling operation, and the rim ends then welded together. Due, however, to the variation in the carbon content of the steel, the rims are made slightly undersized and first expanded and then contracted to the exact size desired, this being done to take the life out of the metal. This expanding and contracting process causes the metal to undergo strain resulting in a considerable loss of the rims made, due to checking, splitting and cracking of the metal. Nearly all rims are split before being sent to automobile manufacturers or users, and when split some will expand and some will contract due to the varying strains present in the metal, and which were not eliminated by the expanding and contracting process. Rims manufactured by this method are also open to the objection that it is difficult to obtain a rim which is of true circular form, due to the warping action which takes place during the rolling operation. After the manufacture of all tire holding rims they are subjected to a rigid inspection for true flanges and channels and circumferential measurement. The inspection is usually done by an inspector furnished by the American Tire & Rim Association and if a rim is found to vary plus or minus .046 of an inch in circumferential measurement or plus or minus a very small fraction of an inch in cross-sectional contour it is thrown out. This rigid inspection results in a considerable loss.

An object of my invention is to avoid the above objections, to simplify and lessen the cost of manufacture of rims and to eliminate the large number of defective rims resulting from the method of manufacture heretofore employed.

The invention is fully described in the following specification, and a preferred method of practicing the same is illustrated in the accompanying drawings, in which,—

Figure 1 is illustrative of the rim section rolling step. Fig. 2 is illustrative of the rim section stamping step. Fig. 3 is a view of a complete rim section. Fig. 4 is a section through a complete rim of the one piece split rim type made by my method, and Fig. 5 is a side view of the hingedly connected multiple section collapsible rim in collapsed form.

In manufacturing rims by my method a rim is built up of a plurality of stamped segmental sections circumferentially aligned, and these sections, two or more of which are preferably employed, are connected together at their ends by welding, hinged joints, or in any other suitable manner, depending on the type of rim desired.

In practicing the invention, strips of metal 1 of the desired length and width to form the rim sections are passed between a set of bending rolls 2 to impart to the strip a bend approximating that of the completed rim section. The bent rim section is then placed between a set of dies 3 and acted on thereby to shape it in the form of the rim section desired, both as to cross-sectional and longitudinal shape, forming a rim section 4, as shown in Fig. 3. A requisite number of these rim sections are then placed together end to end to form a complete rim of true circular form and the abutting ends of the sections may be welded together, as indicated at 5 in Fig. 4, except that the joint between the two abutting ends is left open, thus forming a single piece split rim. In Fig. 5 the rim sections 4 are shown as having their adjoining ends hingedly connected, as shown at 6, to form a rim of the collapsible multiple section type.

With this process the rim sections are rapidly and accurately formed with all parts thereof true, which cannot be accurately accomplished by the rolling process heretofore employed, thereby enabling the requisite number of rim sections to be built up or secured together either by welding hinged joints or otherwise to form a rim which is true in all its dimensions and which is not open to the objection of having the ends thereof spring out in separated relation or spring in past each other in contracted relation, as is the case with rims made by the rolling methods heretofore employed and then split. It is evident that while I have illustrated the rim sections as being first rolled to give them the initial curvature, such curvature may be formed by stamping or in any other manner. It is found preferable in practice, however, to initially curve the rim section strips by rolling before stamping the same. It is also found that the rim sections when stamped do not possess strains which tend to spring the metal from the shape in which it is stamped.

Having thus described my invention, what I claim as new, and desire to secure by Letters Patent, is,—

1. The method of making steel tire carrying rims, which consists in stamping strips of metal to form segmental rim sections of complete cross-sectional rim contour, and then joining the sections together end to end to form a complete rim.

2. The method of making steel tire carrying rims, which consists in stamping sheet metal strips to form a plurality of segmental rim sections of complete rim form in cross-sectional contour, and then assembling the sections in rim form and joining the meeting ends of the sections to form a collapsible rim.

3. The method of making steel tire carrying rims, which consists in rolling strips of metal to impart a predetermined curvature thereto, then stamping the curved strips to form segmental rim sections of complete cross-sectional rim contour, and then joining the sections together end to end to form a complete rim.

In testimony whereof I have hereunto signed my name to this specification.

EZRA H. WULFF.